United States Patent Office 3,600,204
Patented Aug. 17, 1971

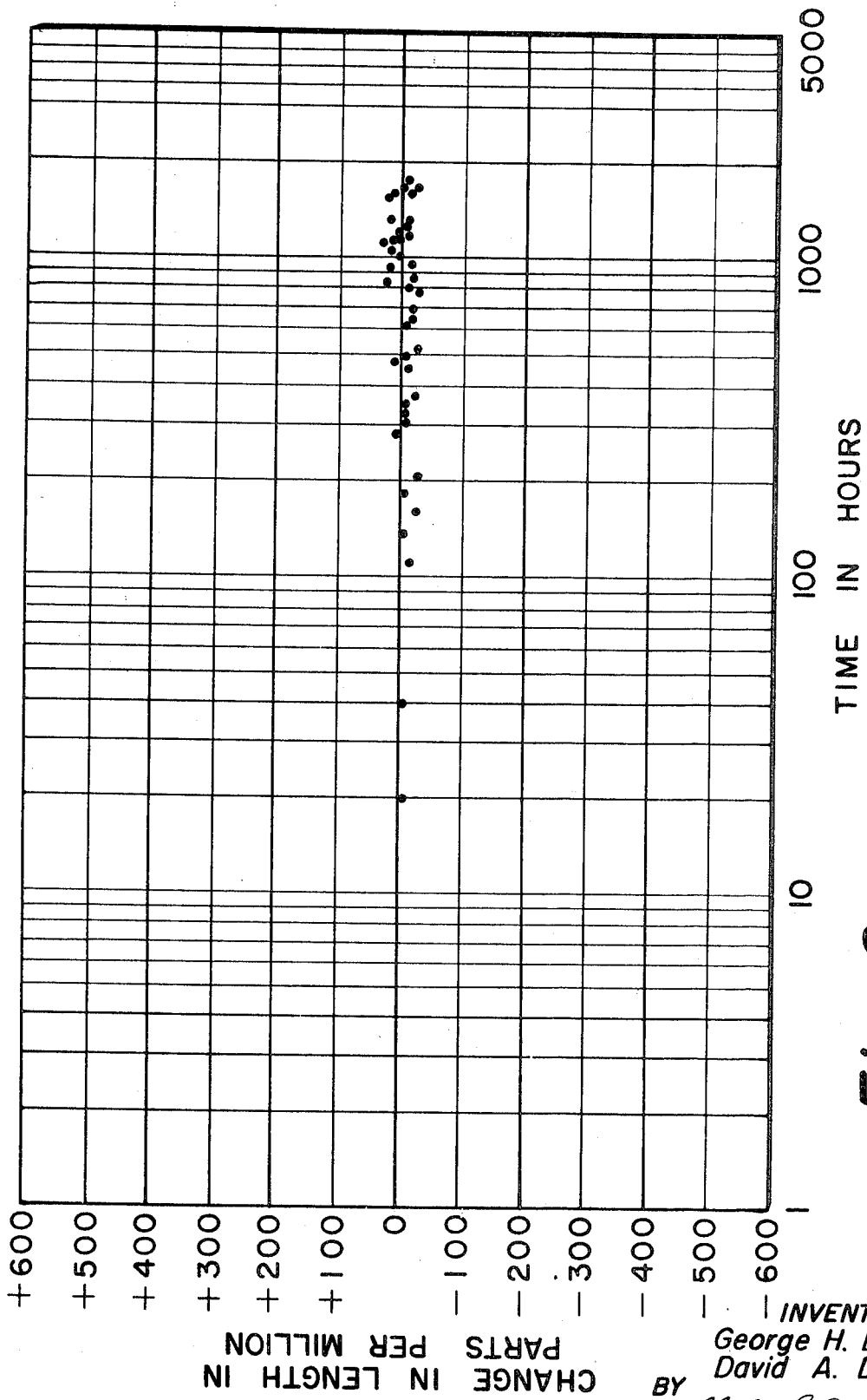

3,600,204
GLASS-CERAMIC ARTICLE PREPARED FROM LOW EXPANSION THERMALLY DEVITRIFIABLE GLASS FRIT
George H. Beall and David A. Duke, Corning, N.Y., assignors to Corning Glass Works, Corning, N.Y.
Filed May 31, 1968, Ser. No. 733,613
Int. Cl. C03c 3/04, 3/22
U.S. Cl. 106—39DV                                    1 Claim

ABSTRACT OF THE DISCLOSURE

This invention relates to the production of a devitrifiable glass frit having a composition within the $Li_2O$-$Al_2O_3$-$SiO_2$ field which exhibits, after devitrification, a coefficient of thermal expansion (0°–1000° C.) of less than $15 \times 10^{-7}/°$ C. and excellent dimensional stability when subjected for long periods of time at temperatures up to 900° C. Such a frit is especially suitable for the manufacture of regenerative heat exchanger bodies for use with gas turbines.

---

Figure 1:

The fabrication of a honeycomb structure for regenerative heat exchanger bodies is described generally in United States Pat. No. 3,112,184 and an improvement thereof is described in United States Pat. No. 3,251,403. Those patents disclose a process wherein a mixture of pulverized ceramic material and a binder, preferably an organic binder, is applied to a flexible carrier, normally a ribbon of some organic material such as tea bag paper. The coated carrier is then crimped and formed to a desired shape by, for example, winding it into a cylindrical shape alone or with a similarly coated but uncrimped ribbon, or stacks of crimped and uncrimped carriers can be laid up. The resultant honeycomb-shaped body is thereafter heated to a sufficiently high temperature to sinter the ceramic material to a unitary structure.

The binder acts to bond the original pulverized ceramic material to the carrier, to impart green strength to the coated carrier, and to maintain the shape of the formed unfired article until sintered. Organic binders which are heat curable or thermoplastic are preferred since these can be removed through decomposition and/or volatilization during the firing of the body. The carrier acts to support the unfired pulverized ceramic material prior to the firing thereof and permits shaping of the unfired material into a desired configuration. Ribbon or strips of organic material are preferred inasmuch as these will decompose when the article is fired, thereby leaving a structure consisting substantially entirely of ceramic material. Various operable organic binders and carrier materials are disclosed in the aforementioned patents to which reference can be made.

It can be appreciated that, by its very nature and use, the material comprising the honeycomb structure of a regenerative heat exchanger must be able to withstand wide changes in temperature such that cracks with resultant breakage will not occur. Further, the material must be dimensionally stable at high temperatures, i.e., desirably there will be no growth or slumping of the material at elevated temperatures leading to subsequent failure of the unit.

Therefore, the primary object of this invention is to provide a ceramic material which exhibits excellent resistance to thermal shock and exceptional dimensional stability upon long exposures to temperatures up to about 900° C.

Other objects will become apparent from the following description of the invention and the appended drawings wherein:

FIG. 1 is an electron micrograph illustrating the extent and fine-grainness of the crystallized frit after the sintering steps; and FIG. 2 is a graph demonstrating the long time dimensional stability of the product of the invention at high temperatures.

We have discovered that the objects of this invention can be attained through thermally devitrifiable glass frits having compositions within a very narrow area of the $Li_2O$-$Al_2O_3$-$SiO_2$ field. Such glasses can be devitrified in situ during sintering to yield now expansion materials having excellent dimensional stability at high temperatures. The major crystalline phase developed is a beta-spodumene solid solution containing principally the three components $LiAlSi_2O_6$ (spodumene), $Al_2O_3$, and $SiO_2$, and, commonly, mullite is present as the minor crystalline phase. The coefficient of thermal expansion of the crystallized material (0°–1000° C.) ranges between about $0$–$15 \times 10^{-7}/°$ C. and after more than 1500 hours at 800° C. the change of length is less than 100 parts/million.

Broadly speaking, our invention comprises melting a batch for a glass consisting essentially, by weight on the oxide basis, of 3.5–7.5% $Li_2O$, 15–30% $Al_2O_3$, and 65–80% $SiO_2$, the mole ratio $Al_2O_3$:$Li_2O$ being between 1.0–1.5. The melt is cooled to a glass and the glass reduced to a finely-divided form, usually to a powder at least minus 100 Tyler mesh (149 microns) and, preferably, minus 200 Tyler mesh (74 microns). In making a honeycomb structure, this powdered glass frit, suitably dispersed in an organic vehicle and/or binder, is applied to the organic carrier ribbon and heated to a temperature at which the glass frit sinters to the parts. This temperature is maintained for a sufficient length of time to sinter the frit and cause it to crystallize in situ to a very substantial extent. In general, the sintering and crystallization temperatures of these glasses range between about 1000°–1350° C. Inasmuch as the crystallization process is time and temperature dependent, a dwell time of only about 1 hour may be required for very satisfactory crystallization where temperatures within the upper extreme of the sintering range are employer, whereas, at temperatures within the lower extreme of the sintering range, times as long as twenty-four hours may be necessary. Of course, much longer sintering times can be utilized, e.g., 72 hours and even longer, with no deleterious effect upon the sintered material but such longer times are normally not commercially attractive. In order to avoid excessive flow of the glass frit when high sintering temperatures are employed, we have learned that the temperature is preferably raised at a rate not exceeding about 5° C./minute above 1000° C. This rate of temperature increase permits the development of sufficient crystallization to support the bulk of the material.

Table I reports several glass compositions, expressed in weight percent on the oxide basis, exemplary of our invention. The batch ingredients for these glasses may be composed of any materials, either oxides or other compounds, which on being melted together, are transformed to the desired oxide compositions in the proper proportions. In the recorded examples, the batch materials were ballmilled together to secure better glass homogeneity and more efficient melting. The batches were placed in open platinum crucibles and melted for about 16 hours at 1550°–1650° C.

TABLE I

|  | Percent | | | | | | |
|---|---|---|---|---|---|---|---|
|  | 1 | 2 | 3 | 4 | 5 | 6 | 7 |
| $SiO_2$ | 72.6 | 72.5 | 70.5 | 69.0 | 66.8 | 65.0 | 78.5 |
| $Al_2O_3$ | 22.5 | 22.0 | 23.0 | 25.2 | 26.5 | 38.5 | 16.6 |
| $Li_2O$ | 4.9 | 5.5 | 6.3 | 5.8 | 6.7 | 6.5 | 4.9 |

Inasmuch as a honeycomb structure for a regenerative heat exchanger was to be made from each glass composition, the melted batch was poured into water to yield finely-divided glass granules and the procedure outlined in United States Pat. No. 3,251,403 followed generally. Thus, the glass articles were dried and ballmilled such that all passed through a 200 mesh Tyler screen. To 25 pounds of powdered glass, four pounds of Carboset 525 and 20 pounds of ethyl acetate were added. Carboset 525 is a thermoplastic acrylic resin supplied by Goodrich Chemical Co. of Cleveland, Ohio which acts as the organic binder whereas ethyl acetate is an organic vehicle. The glass frit and organic materials were further ballmilled to insure a uniform suspension after which ribbon of tea bag paper was immersed into the suspension and then dried at about 100°–120° C. for a few minutes. The dried, coated paper was heated to about 175°–200° C. and crimped to produce a corrugated pattern therein. This crimped, unfired, coated paper was rolled up simultaneously with a ribbon of tea bag paper of the same width which had been coated with the suspension in the same manner but not crimped. The uncrimped coated paper was not dried prior to the roll-up operation but was dried by forcing air heated to about 120° C. through this corrugation of the annular cylinder as it was formed during the roll-up operation.

The unfired matrix body was then placed in an electrically-fired furnace and heated in accordance with the schedules set out in Table II. Table II also records the crystal phases developed in situ during the sintering process as determined through X-ray diffraction analysis.

TABLE II

Example 1

Room temperature to 700° C. at 250° C./hour
Hold 1 hour at 700° C.
700° C. to 800° C. at 20° C./hour
800° C. to 900° C. at 10° C./hour
900° C. to 1000° C. at 25° C./hour
1000° C. to 1300° C. at 100° C./hour
Hold 10 hours at 1300° C.
Cool to room temperature at 200° C./hour
Crystal phases—beta-spodumene solid solution and mullite Example 2

Room temperature to 700° C. at 600° C./hour
Hold 2 hours at 700° C.
700° C. to 800° C. at 250° C./hour.
Hold 2 hours at 800° C.
800° C. to 900° C. at 10° C./hour
900° C. to 1000° C. at 25° C./hour
1000° C. to 1325° C. at 100° C./hour
Hold at 1325° C. for 10 hours
Cool to room temperature at 200° C./hour
Crystal phases—beta-spodumene solid solution and mullite Example 3

Room temperature to 700° C. at 350° C./hour
Hold 1 hour at 700° C.
700° C. to 1220° C. at 100° C./hour
Hold 1 hour at 1220° C.
1220° C. to 1240° C. at 100° C./hour
Hold 18 hours at 1240° C.
Cool to room temperature at 200° C./hour
Crystal phases—beta-spodumene solid solution and mullite Example 4

Room temperature to 700° C. at 250° C./hour
Hold 1 hour at 700° C.
700° C. to 800° C. at 25° C./hour
800° C. to 900° C. at 10° C./hour
Hold 2 hours at 900° C.
900° C. to 1000° C. at 25° C./hour
1000° C. to 1100° C. at 10° C./hour
Hold 24 hours at 1100° C.
Cool to room temperature at 200° C./hour
Crystal phases—beta-spodumene solid solution and mullite Example 5

Room temperature to 500° C. at 250° C./hour
500° C. to 700° C. at 25° C./hour
700° C. to 900° C. at 10° C./hour
900° C. to 1000° C. at 25° C./hour
Hold 1 hour at 1000° C.
1000° C. to 1300° C. at 100° C./hour
Hold 6 hours at 1300° C.
Cool to room temperature at 200° C./hour
Crystal phases—beta-spodumene solid solution and mullite Example 6

Room temperature to 700° C. at 200° C./hour
700° C. to 800° C. at 25° C./hour
Hold 1 hour at 800° C.
800° C. to 900° C. at 25° C./hour
900° C. to 1000° C. at 10° C./hour
1000° C. to 1250° C. at 100° C./hour
Hold 20 hours at 1250° C.
Cool to room temperature at 200° C./hour
Crystal phases—beta-spodumene solid solution and mullite Example 7

Room temperature to 600° C. at 600° C./hour
600° C. to 700° C. at 100° C./hour
Hold 2 hours at 700° C.
700° C. to 900° C. at 25° C./hour
900° C. to 1000° C. at 10° C./hour
Hold 1 hour at 1000° C.
1000° C. to 1325° C. at 250° C./hour
Hold 6 hours at 1325° C.
Cool to room temperature at 200° C./hour
Crystal phases—beta-spodumene solid solution The composition of the devitrifiable frit is critical in obtaining the required presence of beta-spodumene solid solution crystals as well as a residual glassy matrix of the necessary composition to yield a low expansion, thermally stable crystalline material. Thus, the contents of $Li_2O$, $Al_2O_3$, and $SiO_2$ must constitute at least 98% by weight of the total glass composition and certain oxides such as $Na_2O$, $K_2O$, and $CaO$ are preferably absent with the combined amount of these three not exceeding about 0.5 percent. The presence of crystal phases other than the beta-spodumene solid solution and mullite greatly alters the thermal stability of the crystalline material as will the incorporating of any substantial amount of extraneous ions, e.g., $B_2O_3$, $ZnO$, or $MgO$, in the beta-spodumene solid solution. Therefore, very pure batch materials are highly preferred so as to reduce the occurrence of contaminating oxides.

As can readily be seen from FIG. 1, a replica electron micrograph of Example 1 crystallized in situ according to the heat treating schedule reported in Table II, the sintered bodies of this invention are greater than 90% by weight crystalline and, probably, greater than 95% by weight crystalline. As a matter of fact, virtually no glass can be discerned in the micrograph. The white bar at the bottom of the micrograph represents the length of 1 micron so the beta-spodumene solid solution crystals, comprising the vast majority of the crystallization, range between about three to five microns in diameter. The crystals appearing upraised in the micrograph scattered near the grain boundaries of the beta-spodumene solid solution crystals are mullite. Inasmuch as this crystallization was precipitated out of the glass, the very minor amount of residual glass dispersed within the product will be quite different in composition from that of the parent glass frit. Hence, the residual glass is very highly siliceous with a minor amount of $Al_2O_3$.

Sintering temperatures of at least 1000° C. are required to secure crystallization of beta-spodumene solid solution rather than some other low temperature $Li_2O$-$Al_2O_3$-$SiO_2$ phase such as beta-eucryptite solid solution. At temperatures above about 1350° C., the crystallized frit begins to deform and lose its dimensional integrity.

Numerous factors combine to impart excellent thermal stability to the crystalline material. First, elements such as MgO, $B_2O_3$, and ZnO are essentially absent from the material. These elements can develop second crystal phases and can form solid solutions with beta-spodumene which vary widely as a function of temperature. Secondly, the crystallinity of the sintered material is extremely high (greater than about 90% by weight, as measured through electron microscopy and X-ray diffraction) leaving a very small amount of residual glass (virtually all $SiO_2$) having a very high viscosity. Thirdly, the mullite that forms in an amount generally less than 15% by weight of the crystallization, appears to grow along the grain boundaries of the beta-spodumene solid solution and, thereby, may tend to retard secondary grain growth such that the crystals are fine-grained, viz, substantially all finer than 10 microns in diameter. Finally, these high silica, beta-spodumene solid solution crystals have a structure which has been demonstrated through high temperature X-ray diffraction studies to be inherently very stable when impurities are not present. This combination of four factors results in the material illustrating extremely good dimensional stability and with essentially no expansion hysteresis during heating and cooling cycles below about 900° C.

The exceptionally good dimensional stability of these crystallized materials during long term exposures to high temperatures is dramatically portrayed in FIG. 2. That graph (semilogarithmic scale) reports the change in length demonstrated by a 4" long section of a honeycomb structure of Example 1 which had been crystallized in situ according to the heat treating schedule recorded in Table II. This 4" section was heated to 80° C. and maintained at this temperature for about 2000 hours, the changes in length thereof being read at that temperature after various periods of time by means of a length comparator of the type described by Wilmer Souder and Peter Hidnet, "Measurement of Thermal Expansion of Fused Silica," Scientific Papers of the Bureau of Standards, vol. 21, pp. 1–23, Sept. 21, 1925. As can readily be seen from the graph, the greatest change in length observed up to about 2000 hours' exposure was less than 50 parts/million. At 900° C., measurements of such bars have indicated changes in length of only about 100–200 parts/million after 1000 hours' exposure.

Although this invention has been described with special reference to honeycomb structures for regenerative heat exchangers, it will be appreciated that the excellent dimensional stability of these crystallized materials at high temperatures and the low coefficient of thermal expansion thereof render them eminently useful in such other applications as calcining trays and kiln furniture.

Finally, although the invention has been discussed in terms of the final product being formed solely from the glass frit and then the frit sintered to be crystallized in situ, it will be understood that previously-crystallized material may be ground to the proper grain size and then admixed to the glass frit. Such additions appear to result in a very dimensionally-stable product after sintering.

We claim:
1. A crystalline ceramic article having a coefficient of thermal expansion (0°–1000° C.) between about $0-15 \times 10^{-7}$/° C. and excellent dimensional stability at temperatures up to about 900° C. consisting essentially of crystals substantially all finer than 10 microns in diameter dispersed in a glassy matrix, said crystals, comprising at least 90% by weight of the article, consisting essentially of beta-spodumene solid solution with up to 15% by weight mullite and being formed through crystallization in situ from a glass frit consisting essentially, by weight on the oxide basis, of about 3.5–7.5% $LiO_2$, 15–30% $Al_2O_3$, and 65–80% $SiO_2$, the mole ratio $Al_2O_3$:$Li_2O$ being between about 1.0–1.5 and the sum of $Li_2O$, $Al_2O_3$, and $SiO_2$ constituting at least 98% by weight of the total composition.

References Cited

UNITED STATES PATENTS

| | | | |
|---|---|---|---|
| 2,998,675 | 9/1961 | Olcott et al. | 106—39 |
| 3,006,775 | 10/1961 | Chen | 106—39 |
| 3,112,184 | 11/1963 | Hollenbach. | |
| 3,157,522 | 11/1964 | Stookey | 106—39 |
| 3,251,403 | 5/1966 | Smith. | |
| 3,279,931 | 10/1966 | Olcott | 106—39 |
| 3,084,053 | 4/1963 | Arlett et al. | 106—39 |

FOREIGN PATENTS

| | | | |
|---|---|---|---|
| 1,069,227 | 5/1967 | Great Britain | 106—39 |

HELEN M. McCARTHY, Primary Examiner

U.S. Cl. X.R.

65—33; 106—48, 52; 165—10

UNITED STATES PATENT OFFICE
CERTIFICATE OF CORRECTION

Patent No. 3,600,204    Dated August 17, 1971

Inventor(s) George H. Beall and David A. Duke

It is certified that error appears in the above-identified patent and that said Letters Patent are hereby corrected as shown below:

Column 2, line 8, change "now" to -- low --.

Column 2, line 38, change "employer" to -- employed --.

Column 2, line 67, change "38.5" to -- 28.5 --.

Column 5, line 36, change "80°" to -- 800° --.

Claim 1, line 26, change "$LiO_2$" to -- $Li_2O$ --.

Signed and sealed this 21st day of March 1972.

(SEAL)
Attest:

EDWARD M. FLETCHER, JR.   ROBERT GOTTSCHALK
Attesting Officer          Commissioner of Patents